Patented Aug. 6, 1929.

1,723,632

UNITED STATES PATENT OFFICE.

CHARLES M. STINE AND COLE COOLIDGE, OF WILMINGTON, DELAWARE, ASSIGNORS TO E. I. DU PONT DE NEMOURS & COMPANY, OF WILMINGTON, DELAWARE, A CORPORATION OF DELAWARE.

COATING COMPOSITION AND METHOD OF MAKING THE SAME.

No Drawing.  Application filed July 16, 1925.  Serial No. 44,090.

This invention relates to coating compositions and more particularly to a new type of composition containing rubber incorporated with certain derivatives of cellulose.

Hitherto, varnishes, lacquers, etc. have been prepared ordinarily by the mixing of an oil, a drier, a natural or synthetic varnish gum or resin and a thinner. Pigments may be incorporated in such varnishes or lacquers to give color varnishes, enamels, etc.

In a series of co-pending applications, Serial Nos. 681,648; 736,017; 736,018; and 750,661, filed Dec. 19, 1923; Sept. 5, 1924; Sept. 5, 1924; and Nov. 18, 1924, respectively, methods have been disclosed for the preparation of a new type of varnish or enamel in which the gum or resin of the ordinary varnish is replaced by rubber. The resulting compositions are shown to have properties of durability, elasticity, etc. not possessed by ordinary varnishes.

Is has now been found that certain new and useful coating compositions may be obtained by the incorporation of certain cellulose derivatives with a solution of rubber in a suitable thinner. Such coating compositions may contain in addition to the rubber and the cellulose derivative various other ingredients. For example, they may contain in addition a suitable thinner with a curing agent, as a drier, or an oil in a suitable thinner with a drier for the oil and a special curing agent for the rubber, or an oil in a suitable thinner with a pigment and a drier for the oil and a curing agent for the rubber, or simply a pigment incorporated with the cellulose derivative and rubber solution.

A composition consisting of a cellulose derivative and any of the solutions described above when applied to a surface in any suitable manner, and air-dried or heated at a suitable temperature with access of air will form a durable, elastic, tough film which is useful for protective purposes in many ways.

Another important feature is the fact that the rubber contained in such compositions may be cured by the drier when present, and that the oil, when also present, may be oxidized simultaneously by the same drier.

Although the incorporation of oil or pigments, or both, is in some cases advantageous from a practical standpoint, yet as appears above, neither are essenial to the formation of a composition as described, and what we particularly claim herein is the discovery that, under suitable conditions, rubber solutions may be combined with derivatives of cellulose and that the resulting products are useful as protective coatings.

Before proceeding further it seems advisable to define a few terms in the sense that they are hereinafter employed.

The term "cellulose derivatives" includes the cellulosic esters, as for example nitrocellulose and cellulose acetate, and, as well, the ethers of cellulose, which may be designated as conversion products of cellulose in which one or more of the hydroxyl hydrogens of cellulose is (or are) substituted by an alkyl or aromatic group or radical.

By the term "drier" as used throughout the specification and claims we mean a material, generally containing metal compounds, which material is adapted to accelerate drying when added to coating compositions as paints, varnishes, etc., containing a drying oil. Such materials comprise usually a salt or an oxide of a metal such as cobalt, lead, manganese, etc., which function probably as a carrier of oxygen, thereby catalyzing the cure of the rubber as well as the oxidation of the oil. Finely divided metals (as lead and cobalt) also function as driers.

By the term "curing agent" unless otherwise modified we mean any substance which effects the cure of the rubber whether a drier, as defined above, or a non-drying curing agent as dinitrobenzene or the nitro derivatives of other aromatic hydrocarbons, or as a vulcanizing agent and accelerator as sulfur and diphenyl-guanidine. Certain pigments as Prussian blue, white lead, aluminum hydrate also perform to a greater or less extent the function of "curing".

The term "oil" is used to cover animal, vegetable or mineral oil, including all types of drying, semi-drying or non-drying oils, and, as well, specially treated oils, such as blown or ozonized oils.

In the practice of this invention it has been found advisable to use deaggregated rubber. It should be stated here that by "deaggregated rubber" we designate rubber which has undergone while in solution and independently of a mere variation in the ratio of rubber to dispersion medium a loss in viscosity which is appreciable from a practical standpoint, and which loss may range from the least appreciable loss to the limit of minimum low viscosity.

Various methods for deaggregating rubber may be employed, and the following are given as examples only:

(1) Rubber which has been suitably plasticized by milling according to prior art may be dissolved in benzol, turpentine or certain petroleum distillates and drier incorporated therein to give a substantially homogeneous solution which, on ageing in the presence of air or on suitable agitation, will become deaggregated. As an example, illustrative of the above procedure, 2 pounds of rubber are plasticized on a rubber mill for a period of 20 minutes and then dissolved in 18 pounds of benzene, with the aid of mechanical agitation. To this solution is added .01 pound of cobalt linoleate dissolved in .04 pound of turpentine and the whole mixture vigorously agitated in contact with the air for approximately 60 hours. The agitation should be such that air is churned into the solution. At the end of this period it will be found that the viscosity of the solution has dropped to a value of about 40 seconds (by the Scott viscosimeter) as compared to the initial viscosity of about 2,500 seconds.

(2) Likewise, rubber which has been suitably plasticized by milling may be dissolved in turpentine or compounds chemically similar which have been oxidized by the passage of air or oxygen through them, and on proper ageing will become deaggregated. The following example will serve to illustrate the above process: Two pounds of rubber previously milled for 20 minutes are dissolved in 18 pounds of oxidized turpentine. The oxidized turpentine is prepared by blowing oxygen through turpentine for 24 hours. The above rubber solution is then vigorously agitated in contact with the air for 120 hours, when it is found that the viscosity has dropped to a figure of about 80 seconds (Scott viscosimeter) as compared to the initial viscosity of about 2700 seconds.

(3) Certain chemical compounds such as acetic acid, or its substitution products formed by chlorination, benzoic and formic acids, etc., also have the power of deaggregating rubber solutions. The example given below illustrates the above procedure: Two pounds of rubber milled for 20 minutes is dissolved in 18 pounds of benzol. To this solution is added .02 pound of trichloracetic acid, and the mixture mechanically agitated for about 90 hours when the viscosity will have dropped to a value of about 55 seconds (Scott viscosimeter) as compared to an initial viscosity of about 2400 seconds.

Regardless of the method used to bring about deaggregation, we claim the discovery that rubber, which has been deaggregated, may be incorporated with a cellulose derivative, to give coating compositions which, when exposed to the atmosphere or heated in the form of thin films, will give protective coatings of great durability, hardness and flexibility. Moreover, pigments may be incorporated in such compositions to give color varnishes or enamels having the same desirable properties.

One of the principal advantages resulting from the use of deaggragated rubber is an improvement in the ease with which the resulting composition can be applied to various surfaces. This feature is important, for in many cases it makes the use of such compositions practicable in the arts where otherwise they would not be. For example, solutions of such rubber can be satisfactorily sprayed, using the standard types of spray guns. Accordingly, products containing deaggregated rubber can, in general, be successfully sprayed in practical use. This is distinctly a novel feature since rubber solutions of ordinary viscosity (in the case of a 10% solution, around 2500 seconds, Scott viscosimeter) do not spray satisfactorily, but tend to "string" when atomized, and, as well, give unsatisfactory sprayed films, showing "pebbling" or "sags".

The chief advantage secured in the use of deaggregated rubber is due to the fact that solutions of such rubber appear to be more compatible with cellulose derivatitves. We do not wish to limit ourselves to this particular type of rubber, however, and the term "rubber" whenever used throughout this specification includes other varieties such as crude balata, butta percha, hevea, etc., and, as well, vulcanized rubber of any botanical variety in the state of partial to complete vulcanization, as well as reclaimed rubber.

It will be noted that either a non-drying curing or vulvanizing agent or a drier may be used to effect the cure of the rubber constituent. As an example of a non-drying curing agent, we may mention dinitrobenzene or other chemically similar organic nitro compounds. As a vulvanizing agent, sulfur with or without an accelerator, such as diphenyl guanidine, may be used. If a non-drying curing or vulcanizing agent is used and an oil is present, it will probably be desirable to incorporate a drier to accelerate the oxidation of the oil. However, since the drier is capable of acting as a mutual catalyst for both curing the rubber and oxidizing the oil, the presence of both drier and non-drying curing agent is not necessary, although in some cases in which no oil is present, it may be advantageous to effect the cure of the rubber by means of a curing or vulcanizing agent, other than a drier. If a vulcanizing agent such as sulfur is to be used, it may be incorporated by milling into the rubber, according to prior art. The pigment, if present, may be incorporated by grinding in oil to form a paste, or it may be milled directly into the rubber.

The following formulæ will serve to illustrate the range by weight of the preferred proportions and materials which may be employed:

|   |   | Parts |
|---|---|---|
| A. | Rubber | 20 |
|   | Nitrocellulose | 80 |
|   | Linseed oil | 200 |
|   | Lead linoleate | 1.5 |
|   | Butyl acetate | 600 |
| B. | Rubber | 75 |
|   | Ethyl cellulose | 25 |
|   | Perilla oil | 70 |
|   | Cobalt linoleate | 1.2 |
|   | Dibutyl phthalate | 4 |
|   | Lithopone | 120 |
|   | Turpentine | 100 |
|   | Benzene | 200 |
|   | Butyl acetate | 100 |
|   | Ethyl acetate | 100 |
| C. | Rubber | 30 |
|   | Nitrocellulose | 70 |
|   | Linseed oil | 320 |
|   | Wood oil | 80 |
|   | Cobalt linoleate | 2.5 |
|   | Prussian blue | 130 |
|   | Butyl acetate | 350 |
|   | Butyl alcohol | 50 |
|   | Toluol | 100 |
| D. | Rubber | 50 |
|   | Cellulose acetate | 50 |
|   | Cobalt linoleate | 0.5 |
|   | Tricresyl phosphate | 12 |
|   | Butyl acetate | 300 |
|   | Ethyl acetate | 100 |
|   | Ethyl alcohol | 50 |
|   | Benzyl chloride | 50 |
| E. | Rubber | 40 |
|   | Cellulose ether (ethyl) | 30 |
|   | Linseed oil | 100 |
|   | Cobalt linoleate | 1 |
|   | Zinc oxide | 60 |
|   | Benzene | 400 |

The rubber used, as stated before, may be either normal or deaggregated rubber. The cellulose may be present as any cellulose derivative as: nitrocellulose, cellulose acetate or the ethers of cellulose. The oil used may be an animal, vegetable or mineral oil, as previously indicated in our definition of "oil." The cobalt linoleate is merely representative of the class of metallic driers and, in the same way, any of the well known pigments or combinations of pigments may be used. As a solvent or thinner, benzene, buytl acetate, alcohol, etc., are only a few of a large class of these substances which may be used in our compositions. The pigment or the oil or both may be omitted, yielding coating liquids of equal value in the arts. A curing agent, other than cobalt linoleate, may be used to promote the vulcanization of the rubber with equally satisfactory results.

The components represented in the above-mentioned formulæ are formed into a substantially homogeneous solution by agitation. A coating composition such as that of example E when spread out in a thin film and air dried or heated at a temperature of 130° F. for four hours, gives a hard, elastic, waterproof film. However, we do not wish to limit ourselves to this temperature or time of drying, since equally valuable films may be formed by drying at other temperatures and corresponding lengths of time.

In regard to variation of temperature-time conditions of drying, it may be said that, for the specific example E, the approximate limits are: 8 hours at 80° F. to 1 hour at 200° F. However, if the amount of oil is reduced and rubber-cellulose derivative ratio changed to give an increased amount of cellulose derivative to rubber, more rapid drying can be obtained. For example, if the following ratios are used:

|   | Parts |
|---|---|
| Rubber | 20 |
| Cellulose derivative | 80 |
| Oil | 40 | we can obtain satisfactory drying within the approximate limits of 3 hours at 80° F. to ½ hour at 150° F.

As is evident from the formulæ above, the proportion of ingredients may be varied widely, depending on the particular purpose for which the composition is to be used, and our claims are, of course, not limited to any particular formula, although it has been found that the best results are obtained by adhering to the range of proportions of ingredients indicated.

The usefulness of protective coatings as hereinbefore described may sometimes be increased by the addition, as illustrated in some of the examples, of a softener. We designate by the term "softeners" those difficultly volatized substances which, on incorporation to the extent of about 5% (based on the total composition), impart the property of flexibility, elasticity or toughness to the film. Tricresyl phosphate, castor oil, acetyl laurin, and dibutyl phthalate may be mentioned as examples of such a substance, but our claims are by no means limited to these four substances.

The films prepared in accordance with our invention have many properties of great value in the arts. They are durable, elastic, waterproof, and hard. Due to the flexibility imparted by the rubber content, the durability is greater than in the case of straight cellulose derivative lacquers while, on the other hand, the content of cellulose derivatives imparts a hardness not secured previously in straight rubber or rubber and oil films. The presence of cellulose derivatives also materially decreases the drying time of these coating compositions over ordinary varnishes and paints. The chief constituents of the products hereinbefore described assist in making substantially waterproof films not secured by ordinary varnish and paint films. The practicability of application increases the value of these compositions, since the compositions described in our invention may be satisfactorily sprayed, brushed, flowed or dipped, as well as applied by other means. Due chiefly to the rubber content specified in the compositions hereinbefore described in our invention, films prepared from these compositions adhere tenaciously to practically all types of surfaces; as, metal, wood, leather and cloth.

To summarize, therefore, we have found that coating compositions may be prepared by incorporating cellulose derivatives in a suitable solvent, with rubber, and with a curing or vulcanizing agent in a suitable solvent. Oil, and drier for the oil, as well as pigments, may be incorporated in such a composition to give paints or enamels or other coating compositions suitable for similar uses. If oil and a drier are employed the weight of the drier, calculated as metal, will not, in general, exceed 10% of the weight of the oil and rubber combined.

We claim:

1. The process of preparing a coating composition which comprises mixing rubber with a drying oil, a cellulose derivative and a substance which acts as a mutual catalyst for the curing of the rubber and the oxidation of the oil.

2. The process of preparing a coating composition which consists in mixing with 100 parts of rubber from 1 to 400 parts of cellulose derivative, from 1 to 7800 parts of drying oil and a drier in an amount ranging from .001% to 10% of the weight of the oil and rubber combined, the drier being calculated as metal.

3. The process of preparing a coating composition which consists in mixing with 100 parts of deaggregated rubber from 1 to 100 parts of ethyl cellulose, from 1 to 7800 parts of perilla oil, from 1 to 78 parts of a softener and cobalt linoleate in an amount ranging from .001% to 10% of the weight of the oil, the linoleate being calculated as cobalt.

4. A coating composition which comprises a solution of rubber, a drying oil, a cellulose derivative and a substance which acts as a mutual catalyst for the curing of the rubber and the oxidation of the oil.

5. A coating composition which comprises a solution of rubber, a drying oil and a cellulose derivative in admixture with a drier for the oil which also acts as a curing agent for the rubber and a non-drying curing agent for the rubber.

6. A coating composition which comprises by weight 100 parts of rubber, from 1 to 400 parts of cellulose derivative, from 1 to 7800 parts of drying oil, and a drier in an amount ranging from .001% to 10% of the weight of the oil and rubber combined, the drier being calculated as metal.

7. A coating composition comprising deaggregated rubber, a drying oil, a cellulose derivative and a substance adapted to effect deaggregation and curing of the rubber and drying of the oil.

8. A non-aqueous coating composition comprising a cellulose derivative and a solution of rubber in an organic solvent, said solution containing at least 10% rubber and having a viscosity not over 80 seconds as measured by the Scott viscometer.

In testimony whereof we affix our signatures.

CHARLES M. STINE.
COLE COOLIDGE.